Jan. 4, 1966  C. F. STAHMER  3,227,233
SCALE

Filed March 1, 1965  3 Sheets-Sheet 1

INVENTOR.
C.F. STAHMER
BY

Jan. 4, 1966 C. F. STAHMER 3,227,233
SCALE
Filed March 1, 1965 3 Sheets-Sheet 2

INVENTOR.
C. F. STAHMER
BY

Jan. 4, 1966 C. F. STAHMER 3,227,233
SCALE

Filed March 1, 1965 3 Sheets-Sheet 3

INVENTOR.
C.F. STAHMER
BY

United States Patent Office 3,227,233
Patented Jan. 4, 1966

3,227,233
SCALE
Christian F. Stahmer, 3079 S. 34th St., Omaha, Nebr.
Filed Mar. 1, 1965, Ser. No. 435,790
3 Claims. (Cl. 177—206)

This invention relates to scales and more particularly it is an object of this invention to provide an economical and effective method of converting beam scales of the type using shifting weights by attaching a dial indicator thereto with the use of a new mechanism for interconnecting the scale lever and an indicator shaft, the new mechanism making possible either greater economy or greater accuracy or greater durability as compared with mechanisms for similar purposes in the prior art.

More particularly it is an object to provide two drums on an indicator shaft, each drum having a tape attached thereto and extending thereover, one of the tapes being attached to the scale lever, the other of the tapes being attached to a calibrated spring.

I am aware that springs have been used in the prior art and one of the most popular uses has been in applying two springs to a rack and pinion mechanism. It is an object to provide an elimination of the disadvantages of a rack and pinion mechanism, however, because the teeth of the rack and pinion tend to wear and become loose introducing inaccuracies. Such mechanisms tend to bind when a scale becomes tilted. A further disadvantage of the rack and pinion type has been in the movement of the position of anchoring of the springs. It is a particular object of this invention to provide a mechanism in which the spring is permanently anchored so that the spring need only move upwardly and downwardly in expansion and contraction, providing greater accuracy.

I am aware that others have used tapes and drums in interconnecting scale levers and indicator shafts heretofore. One example is found in Patent No. 1,850,628, issued March 22, 1932, to Louis Jaenichen, titled, Scale. In this patent a single tape is used and a maximum travel of the tape in one direction is limited to ninety degrees, confining the scale because of this principle, to only a limited range of dial indication.

It is an object of this invention to utilize two tapes, each drum mounted on the same shaft, one unwinding while the other is winding, and vice versa, each tape being capable of winding or unwinding one hundred eighty degrees to give a greater and more desirable amount of indication.

I am aware also of a Patent No. 1,277,698, issued September 3, 1918, to E. R. Cross, titled, Weighing Scale. In this patent, a spring-anchored tape makes a complete loop around a drum for moving with a three hundred sixty degree rotation of a dial indicator shaft. The disadvantage of this principle is that as the tape winds and unwinds, it is inevitably shifted horizontally along the axis of the drum. This horizontal shifting of the tape causes error in the dial indication introducing inaccuracies that can be expensive, for accurate weighing is important.

I am also aware of Patent No. 1,392,976, issued October 11, 1921, to W. F. Stimpson, titled, Computing Scale. In this patent, one drum uses a tape, but the other drum has a belt interconnecting two pulleys. As is now well-known, a belt will slip, introducing inaccuracies. If it is so tight as not to slip, the friction introduced causes an inaccuracy in weighing.

Still another object is to provide an economical way to convert a common beam scale of the type using removable weights to be a combination dial indicator scale and removable weight beam scale, with a great range of weight being readable on the dial for making the time-consuming addition of smaller weights unnecessary.

Other and further objects and advantages of the present invention will be apparent from the following detailed description, drawings and claims, the scope of the invention not being limited to the drawings themselves as the drawings are only for the purpose of illustrating a way in which the principles of this invention can be applied.

Other embodiments of the invention utilizing the same of equivalent principles may be used and structural changes may be made as desired by those skilled in the art without departing from the present invention and the purview of the appended claims.

Figure 1:
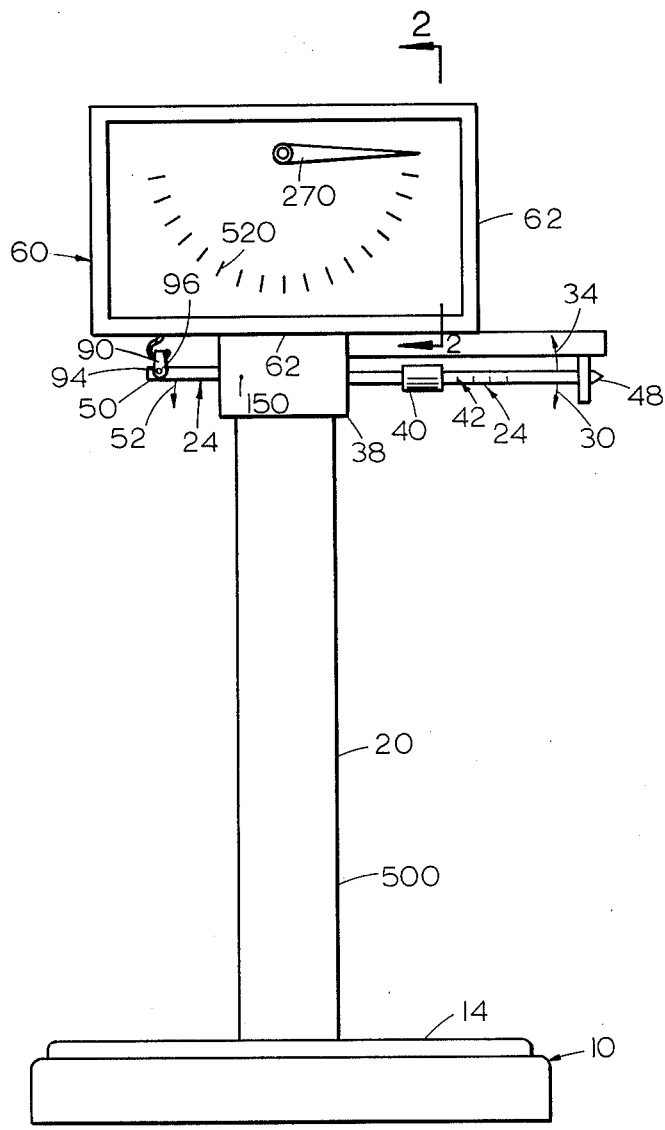
FIGURE 1 is a frontal elevation of a movable weight beam scale shown with the visual indication assembly of this invention mounted thereon.

Referring to FIGURE 1, a common beam scale is there shown at 10 having a movable plate 14 on which a weight to be weighed is rested, and further having a post 20 in the upper end of which a conventional lever 24 is mounted for tilting at times downwardly in the direction of an arrow 30 or at times upwardly in the direction of an arrow 34 at the right end of the lever 24. It is to be understood that the lever 24 is mounted for pivoting about a horizontal axis extending through the lever 24 at a point inside the upper cover 38 of the post 20, as is not shown inasmuch as the lever 24 and its mounting is conventional.

The lever 24 is adapted to carry a sliding weight 40 as is conventionally selectively placed at various positions along the lever 24 to counterbalance a substantial portion of the weight of any object placed on the platform 14.

It will be seen that the weight 40 has a leverage and that a weight placed on the platform 14 will tend to cause the right end 48 of the lever 24 to move upwardly, whereas the weight 40 will tend to urge the right end of the lever 24 downwardly, as is conventional.

The moving lever 24 has an end 50 which is on the left hand side of the said horizontal axis of pivoting of the lever 24, whereby the left end 50 moves downwardly in the direction of arrow 52 whenever the object to be weighed, not shown, is placed on the platform 14. In accordance with this invention, a visual indication assembly 60 is mounted on the top of the upper housing portion 38, the visual indication assembly 60 having a box-like housing 62 which can be suitably fixed to the upper housing portion 38 along abutting surfaces 62, as seen in FIGURE 1.

The housing 62 has an opening 68 extending through its floor 70 and a connector assembly 72 is attached to the left end 50 of the lever 24 and extends through the opening 68 upwardly to a pivotal connection with an arm 80 of the visual indication assembly, the pivotal connection being along a horizontal axis through a connector 82.

The connection assembly 72 is characterized by its flexibility because of loosely interfitted parts 84, 86, 88, and 90, the part 90 being a clevis pivotally attached to the lever 24 for pivoting along a horizontal axis 94 identified by a connector 96.

The arm 80 has its normally left-hand or anchored end 120 attached to a mounting bracket 122 by means of a fitting 124, which latter accomplishes a pivoting of the arm 80 about a horizontal axis disposed at a substantial spacing to one side of a horizontal axis 140 through the connector 82. The axis through the fitting 124 can be called a third axis 144, and it is disposed in paralelism with the axis 140 which can also be called a second axis 140.

The lever 24 can be considered to be pivoted about a first axis 150, which latter is diagrammatically indicated in FIGURE 1 on the outside of the housing 38, the axis 150 extending normally with respect to the lever 24 and also extending horizontally.

That end of the arm 80 which is opposite the anchored end 120 shall be called the free end 160 and it is attached by a second flexible connection assembly 164 pivotally to the lower end of a first tape 170, which latter can also be called an arm-tape 170.

Figure 2:
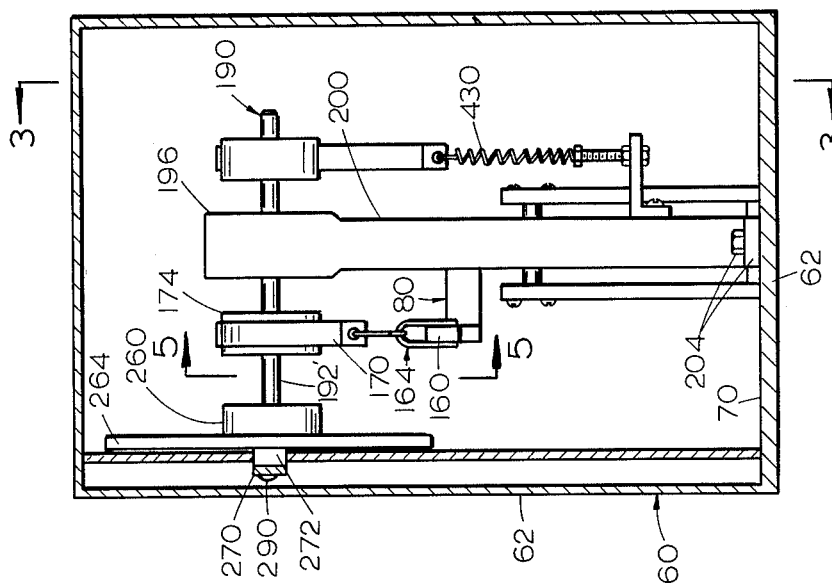
FIGURE 2 is a sectional view taken along the line 2—2 of FIGURE 1, and showing the visual indication assembly with its housing in cross section.
Figure 5:
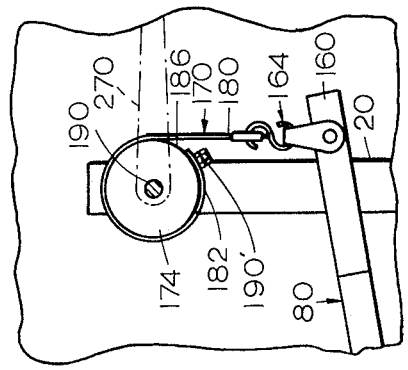
FIGURE 5 is a sectional view looking rearward along the line 5—5 of FIGURE 2.
Figure 3:
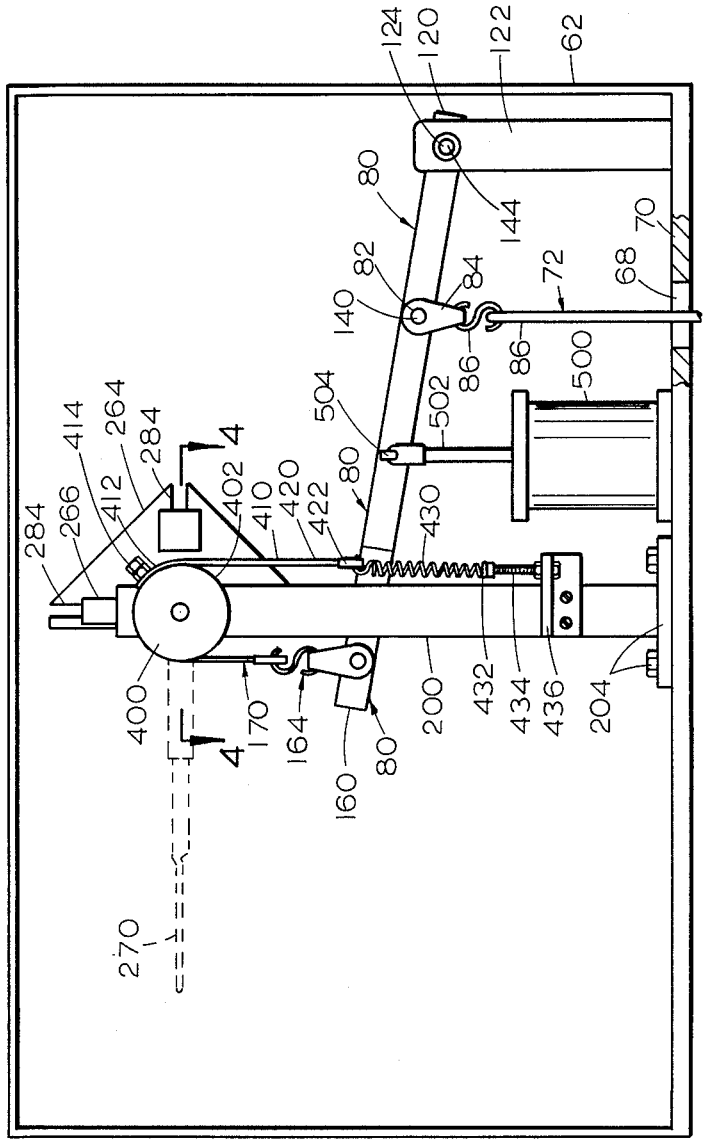
FIGURE 3 is a sectional view taken along the line 3—3 of FIGURE 2 and showing the rearward side of the assembly with a rearward portion of the housing removed, the parts being in the position they are in when the indicator arm is in a position indicating an unloaded scale.

As best seen in FIGURE 2, the arm-tape 170 is disposed extending over the top of and around the majority of the perimeter of a first drum 174.

The tape 170 has a lower end 180 which is connected to the second flexible assembly 164, and also has an anchored terminal end 182 which is attached to the circumference 186 of the drum 174 by anchoring means 190'.

Figure 4:
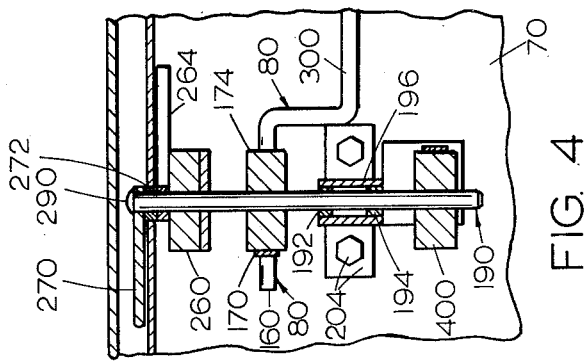
FIGURE 4 is a sectional view looking downward along the line 4—4 of FIGURE 3.

The first drum 174 has a cylindrical outer surface 186 receiving the tape 170 thereon, and the drum 174 is fixed to a shaft 190 for rotation therewith, the shaft 190 being horizontally disposed and being mounted in bearings 192 and 194 of a bearing housing 196, best seen in FIGURE 4, which latter is mounted on the upper end of a bearing staff 200 which extends downwardly, having its lower end attached to the floor 70 of the housing 62 by suitable means 204.

The shaft 190 has a forward end 192' to which is attached a carrier 260 having an adjustment weight plate 264 mounted thereon and having an indicator arm 270 mounted by suitable means 272 to the forward end of the carrier 260, whereby the indicator arm 270 extends normally to the shaft 190 and rotates therewith.

As best seen in FIGURE 4, the forward end of the shaft can receive a bolt 290 threadedly therein for pressing the arm 270 against a washer 272 which latter presses against the weight plate 264, which latter presses against the carrier 260, whereby, in effect, the indicator arm 270 is compressed by the bolt 290 in a manner such that it rotates with the shaft 190.

As best seen in FIGURE 4, the weight plate 264 carries adjustably positionable weights 266 which slide in slots 284 for adjustable positioning for counterbalancing.

As best seen in FIGURE 4, the end 160 of the arm 80 is offset with respect to the opposite end portion 300, the portion 300 being the major portion of the total length of the arm 80. By this means, the end 160 of the arm 80 can be disposed under the drum 174 even though the remainder or larger portion 300 of the arm 80 is disposed in alignment with the staff 200, which latter is also in alignment with the vertically extending connection assembly 72.

On the opposite side of the bearings 192 and 194 from the first drum 174 is a second drum 400, which latter has a cylindrical outer surface 402 receiving thereagainst a second tape or spring tape 410, which latter has an upper end 412 suitably anchored by means 414 to the circumference 402 of the drum 400.

The second tape or spring tape 410 extends downwardly and has a lower end 420 attached by suitable means 422 to the upper end of a tension spring 430, which latter has a lower end 432 anchored adjustably by a bolt 434 to a bracket 436 on the staff 200.

It will be seen that the housing 62 can also be called a frame of the visual indication assembly 60. Likewise, the beam scale 10 can be considered to have a frame 500 of which the post 20 is a part.

It will be seen that the tapes 170 and 410 are also to be called first and second flexible elongated members 170 and 410, respectively, and it will be seen that the tapes 170 and 410 extend around opposite sides of the drums 174 and 400 so that at times when one tape is winding up, the other tape will be unwinding and vice versa.

The amount of winding and unwinding is sufficient to gain a 180-degree rotation of the indicator arm 80, or at the least, a rotation substantially greater than, for example 120 degrees, it being understood that a rotation of 180 degrees is an attainable ideal.

It will be seen that the lever 24 is what is commonly called the weigh beam and that a certain part of the weight of an object can be weighed by shifting the weight 40 along the weight beam in accordance with the indicia 42 which are spaced apart along the weigh beam or lever 24, whereby the position of the weight 40 will indicate a certain part of the weight of an object placed on the platform 14. And the position of the indicator 270 will indicate the remainder of the weight on the platform 14.

Therefore, if the weight of the object being weighed is great enough to require use of the weight 40, then the weight indicated by the position of the weight 40 is added to the weight shown on the indicator on the scale 520 to give the total exact weight of the object weighed on platform 14.

It will be seen that a swift weighing is thereby accomplished, that a common beam scale can be economically converted, and that the objects above set forth are fulfilled.

From the foregoing description, it is thought to be obvious that a scale constructed in accordance with my invention is particularly well adapted for use, by reason of the convenience and facility with which it may be assembled and operated and it will also be obvious that my invention can be changed and modified without departing from the principles and spirit thereof, and for this reason, I do not wish to be understood as limiting myself to the precise arrangement and formation of the several parts herein shown in carrying out my invention in practice, except as claimed.

I claim:

1. In combination: a scale having a platform for receiving objects to be weighed, a lever extending approximately horizontally and adapted to pivot about a horizontal lever axis extending normally to said lever, said scale being of a type in which one end of said lever moves upwardly at a time when a weight is placed on said platform, and said lever having a portion extending on the opposite side of said lever axis from said one end and providing another end of said lever, a visual indication assembly mounted on said scale, and having a frame mounted on the frame of said scale, said visual indication assembly further having: an elongated arm extending approximately horizontally, one end of said arm being pivotally anchored to said assembly frame in a manner for permitting the opposite end of the arm to swing upwardly and downwardly with respect to said frame, a first flexible connection assembly attached to said arm at a point intermediate the ends thereof and extending downwardly, the lower end of said first flexible connection assembly being attached to the said other end of said lever whereby when said other end of said lever moves downwardly, said arm is pulled downwardly, a shaft extending horizontally, means rotatably mounting said shaft on said frame, an indicator arm mounted on said shaft and extending normally with respect thereto, a pair of drums mounted on said shaft, a first elongated flexible member having a lower end, means flexibly interconnecting the lower end of said first elongated member to said other end of said arm, said first elongated member extending upwardly from its lower end along one side of a first one of said drums and extending around the said first drum and having an anchored end, means anchoring said anchored end of said first elongated member to said first drum, a second elongated member having a lower end, means attached to the lower end of said second elongated member for exerting a pull downwardly thereon, said second elongated member extending alongside said second drum on an opposite side of said shaft from said first elongated member, said second elongated member having an upper portion extended around said drum, the upper portion of said second elongated member having an anchored end, means anchoring said anchored end of said second elongated member to said second drum, and an indicator scale disposed in cooperative relationship with said indicator, means suitably mounting said indicator scale on said frame, a downward movement of said lever being resisted by the effect of said means pulling downwardly on said second elongated member and said indicator arm moving across said scale in proportion to the extent to which a downward pull on said arm is exerted by said first flexible connection assembly in response to downward movement of said other end of said lever as a result of the weight affect of an object placed on said platform, whereby a portion of the weight of said object is indicated by said indicator on said scale.

2. The combination of claim 1 in which said means pulling down on said lower end of said second elongated member is specifically a tension spring.

3. The combination of claim 1 in which a slidable weight is mounted on said lever and is adapted to be shifted lengthwise of said lever and in which said scale has indicia thereon for indicating the position of said weight, whereby the position of said weight indicates a portion of the weight of said object and the position of said indicator indicates the remainder of the weight of said object.

No references cited.

LEO SMILOW, *Primary Examiner.*